(12) United States Patent
Georgeson et al.

(10) Patent No.: US 11,561,078 B2
(45) Date of Patent: Jan. 24, 2023

(54) METHODS AND SYSTEMS FOR MEASURING GAPS BETWEEN EXTERIOR STRUCTURES AND INTERIOR STRUCTURES

(71) Applicant: The Boeing Company, Chicago, IL (US)

(72) Inventors: Gary E. Georgeson, Tacoma, WA (US); William J. Tapia, Graham, WA (US)

(73) Assignee: The Boeing Company, Chicago, IL (US)

( * ) Notice: Subject to any disclaimer, the term of this patent is extended or adjusted under 35 U.S.C. 154(b) by 384 days.

(21) Appl. No.: 16/840,256

(22) Filed: Apr. 3, 2020

(65) Prior Publication Data

US 2021/0310783 A1   Oct. 7, 2021

(51) Int. Cl.
*G01B 7/15* (2006.01)
*G01N 27/02* (2006.01)
*B64F 5/10* (2017.01)

(52) U.S. Cl.
CPC ............ *G01B 7/15* (2013.01); *G01N 27/023* (2013.01); *B64F 5/10* (2017.01)

(58) Field of Classification Search
CPC ... G01B 7/14; G01B 7/15; G01B 5/14; G01B 5/16; G01B 11/14; G01B 21/14; G01N 27/023; B64F 5/00; B64F 5/10; B64F 5/60
USPC ........................................................ 324/228
See application file for complete search history.

(56) References Cited

U.S. PATENT DOCUMENTS

| 4,967,485 A  * | 11/1990 | Brown ...................... G01B 7/14 33/787 |
| 5,768,794 A  * | 6/1998  | Kelly ....................... G01B 3/46 33/542 |
| 6,115,930 A  * | 9/2000  | Shigyo ................... H04B 7/022 33/542 |
| 6,815,947 B2 * | 11/2004 | Scheiner ................ G01B 7/105 324/229 |
| 7,750,626 B2 * | 7/2010  | Lefebvre ............ G01N 27/9053 324/240 |

(Continued)

FOREIGN PATENT DOCUMENTS

| CN | 102927895 A | * | 2/2013 |
| CN | 202885773 U | * | 4/2013 |

(Continued)

*Primary Examiner* — Patrick Assouad
*Assistant Examiner* — Sean Curtis
(74) *Attorney, Agent, or Firm* — Kunzler Bean & Adamson

(57) ABSTRACT

Disclosed herein is a method of measuring a gap between exterior structures and interior structures. The method comprises directing a transmitted m-wave signal from an exterior surface of the exterior structure into the exterior structure and the interior structure. The transmitted m-wave signal is generated by a gap sensing device that comprises an electromagnetic dual-tuned resonant coil sensor. The method also comprises measuring a received m-wave signal with the gap sensing device. The received m-wave signal comprises the transmitted m-wave signal influenced by the assembly. The method further comprises determining a size of the gap between the exterior structure and the interior structure based at least partially on at least one measured characteristic of the received m-wave signal.

20 Claims, 11 Drawing Sheets

(56) References Cited

U.S. PATENT DOCUMENTS

| | | | |
|---|---|---|---|
| 8,284,560 B2 * | 10/2012 | Iravani | H01L 22/12 |
| | | | 451/6 |
| 8,536,860 B2 * | 9/2013 | Boenisch | G01N 27/90 |
| | | | 324/242 |
| 9,316,617 B2 * | 4/2016 | Graebner | G01N 27/902 |
| 9,772,313 B2 * | 9/2017 | Blom | G01N 29/043 |
| 10,190,992 B2 * | 1/2019 | Imai | G01N 21/88 |
| 10,240,909 B2 * | 3/2019 | Safai | G01B 7/001 |
| 10,352,684 B2 * | 7/2019 | Safai | G01B 7/14 |
| 10,816,510 B1 * | 10/2020 | Tapia | G01B 7/142 |
| 2013/0185950 A1 * | 7/2013 | Oode | G01B 7/06 |
| | | | 33/783 |
| 2014/0109418 A1 * | 4/2014 | Wu | G01B 3/50 |
| | | | 33/501.6 |
| 2014/0305217 A1 * | 10/2014 | Tapia | G01N 27/9013 |
| | | | 901/44 |
| 2015/0215584 A1 * | 7/2015 | Tapia | G01N 21/8851 |
| | | | 348/125 |
| 2016/0313287 A1 * | 10/2016 | Blom | G01B 17/00 |
| 2018/0090253 A1 * | 3/2018 | Songatikamas | G06F 3/0416 |
| 2018/0106588 A1 * | 4/2018 | Safai | G01B 7/14 |
| 2018/0106589 A1 * | 4/2018 | Safai | G01B 7/14 |
| 2019/0154561 A1 * | 5/2019 | Tat | G01N 15/088 |
| 2020/0333294 A1 * | 10/2020 | Tapia | G01B 7/14 |
| 2020/0339282 A1 * | 10/2020 | Rogers | B64F 5/00 |
| 2021/0131785 A1 * | 5/2021 | Wolynski | G01B 7/16 |
| 2021/0278372 A1 * | 9/2021 | Clossen-von Lanken Schulz | |
| | | | G01N 27/906 |
| 2021/0310783 A1 * | 10/2021 | Georgeson | G01B 7/14 |

FOREIGN PATENT DOCUMENTS

| | | | | |
|---|---|---|---|---|
| CN | 102927895 B | * | 12/2014 | |
| CN | 111351798 A | * | 6/2020 | B64F 5/60 |
| CN | 107957232 B | * | 1/2021 | G01B 7/001 |
| EP | 2910935 A2 | * | 8/2015 | G01M 5/0033 |
| EP | 3086117 A1 | * | 10/2016 | B64F 5/10 |
| EP | 3531123 A1 | * | 8/2019 | G01M 5/0016 |
| EP | 3617698 A1 | * | 3/2020 | G01M 13/04 |
| EP | 3086117 B1 | * | 11/2020 | B64F 5/10 |

\* cited by examiner

METHODS AND SYSTEMS FOR MEASURING GAPS BETWEEN EXTERIOR STRUCTURES AND INTERIOR STRUCTURES

FIELD

This disclosure relates generally to measuring gaps, and more particularly to measuring inaccessible gaps between an exterior structure and an interior structure coupled to the exterior structure.

BACKGROUND

Some assemblies include two or more structures joined together at an interface with dimensions constrained by a predetermined tolerance. For example, in the aerospace industry, the gap between certain joined structures are less than a predetermined tolerance, such as 0.005 inches. When a gap exceeds the predetermined dimension, a shim or another gap-reduction method can be used to effectively reduce the gap between joined structures to ensure the predetermined tolerance is met and the joined structures fit together properly.

To determine if interfacing surfaces of joined structures are within the predetermined tolerance, gaps between the joined structures are detected and measured. One known method of determining the size of a gap between joined structures includes manually measuring the gap. For example, a technician can manually insert a mechanical device, such as a feeler gauge, into the gap. Accordingly, through progressive trial and error a technician can obtain a plurality of gap measurements at different locations along the interfacing surfaces of joined structures. The technician then records the measurements and often a shim is cut based on the measurements and placed in the gap. Manually measuring gaps and fitting shims in this manner is often a time-consuming process that requires several iterations. Moreover, such a manual measurement process is useful only if the gap is accessible for manual measurement. Often, the gap is an interior gap or an enclosed gap, which makes access to the gap from an exterior of the assembly or even an interior of the assembly difficult.

Another known method of determining the size of a gap between joined structures includes using an electronic device to measure the gap. More specifically, a technician can manually position an electronic device at a first location to obtain a first measurement, reposition the electronic device to a second location to obtain a second measurement, and further reposition the electronic device as needed. The shim is then manufactured in the same manner as described above.

However, both the mechanical and electronic measuring devices are configured to obtain a single measurement at a single location within the gap requiring a technician to manually reposition the device at various locations within the gap. Additionally, the technician manually identifies the exact location within the gap being measured, for example, by using a sketch, relying on the technician's ability to accurately identify a location that the measurement is being performed. As a result, measuring a gap by using either the mechanical and electronic measuring devices is a time-consuming and labor-intensive process and may not result in measurements having a required precision to fabricate a shim or other method of filling the gap. Furthermore, many joined structures define confined spaces that make manual access to the joined structures by a technician not only difficult, but often uncomfortable and unsafe.

SUMMARY

The subject matter of the present application provides examples of methods of measuring gaps that overcome the above-discussed shortcomings of prior art techniques. The subject matter of the present application has been developed in response to the present state of the art, and in particular, to help overcome the shortcomings of conventional methods of measuring gaps.

Disclosed herein is a method of measuring a gap between an exterior structure and an interior structure of an assembly when the exterior structure is coupled to the interior structure. The method comprises calibrating a gap sensing device using calibration data. The gap sensing device comprises an electromagnetic dual-tuned resonant coil sensor. The method also comprises directing a transmitted m-wave signal from an exterior surface of the exterior structure into the exterior structure and the interior structure. The transmitted m-wave signal is generated by the gap sensing device. The method also comprises measuring a received m-wave signal with the gap sensing device. The received m-wave signal comprises the transmitted m-wave signal influenced by the assembly. The method further comprises comparing the calibration data with at least one measured characteristic of the received m-wave signal. The method additionally comprises determining a size of the gap between the exterior structure and the interior structure based at least partially on the comparison between the calibration data and the at least one measured characteristic of the received m-wave signal. The preceding subject matter of this paragraph characterizes example 1 of the present disclosure.

The step of calibrating the gap sensing device using calibration data comprises directing a test M-wave signal generated by the gap sensing device into a test assembly configured to replicate the assembly but with the gap between the exterior structure and the interior structure to have a predetermined size. The step also comprises measuring a received test M-wave signal with the gap sensing device, the received test M-wave signal comprises the test M-wave signal influenced by the test assembly. The step further comprises generating the calibration data based on at least one measure characteristic of the received test M-wave signal. The preceding subject matter of this paragraph characterizes example 2 of the present disclosure, wherein example 2 also includes the subject matter according to example 1, above.

The calibration data may also comprise at least one characteristic of the received m-wave signal representing the received m-wave signal if the gap between the exterior structure and the interior structure was a predetermined size. The preceding subject matter of this paragraph characterizes example 3 of the present disclosure, wherein example 3 also includes the subject matter according to any one of examples 1 or 2, above.

The step of directing the transmitted m-wave signal from the exterior surface of the exterior structure into the exterior structure and the interior structure further comprises moving the gap sensing device along the exterior surface of the exterior structure as the transmitted m-wave signal is directed from the exterior surface of the exterior structure into the exterior structure and the interior structure. The preceding subject matter of this paragraph characterizes example 4 of the present disclosure, wherein example 4 also includes the subject matter according to any one of example 1-3, above.

The gap sensing device is moved along the exterior surface of the exterior structure using a robotic arm or a crawling robot. The preceding subject matter of this paragraph characterizes example 5 of the present disclosure, wherein example 5 also includes the subject matter according to example 4, above.

The step of measuring the received m-wave signal with the gap sensing device comprises measuring the received m-wave signal with the gap sensing device as the gap sensing device is moved along the exterior surface of the exterior structure. The preceding subject matter of this paragraph characterizes example 6 of the present disclosure, wherein example 6 also includes the subject matter according to any one of examples 1-5, above.

The gap sensing device comprises a transmitting coil and a receiving coil. The step of directing the transmitted m-wave signal from the exterior surface of the exterior structure into the exterior structure and the interior structure further comprises moving the transmitting coil of the gap sensing device along the exterior surface of the exterior structure as the transmitted m-wave signal is directed from the exterior surface of the exterior structure into the exterior structure and the interior structure. The step of measuring the received m-wave signal with the gap sensing device further comprises measuring the received m-wave signal with the receiving coil of the gap sensing device as the receiving coil is moved along the interior surface of the interior structure. The preceding subject matter of this paragraph characterizes example 7 of the present disclosure, wherein example 7 also includes the subject matter according to any one of examples 1-6, above.

The method further comprising identifying the assembly as acceptable when the size of the gap is less than a predetermined threshold and as unacceptable when the size of the gap is more than a predetermined threshold. The calibration data comprises the predetermined threshold. The preceding subject matter of this paragraph characterizes example 8 of the present disclosure, wherein example 8 also includes the subject matter according to any one of examples 1-7, above.

The method further comprising forming a shim to fill the gap when the size of the gap is more than the predetermined threshold. The shim is sized based on the size of the gap. The method also comprises locating the shim in the gap between the exterior structure and the interior structure. The preceding subject matter of this paragraph characterizes example 9 of the present disclosure, wherein example 9 also includes the subject matter according to example 8, above.

The gap between the exterior structure and the interior structure is filled with a substance. The preceding subject matter of this paragraph characterizes example 10 of the present disclosure, wherein example 10 also includes the subject matter according to any one of examples 1-9, above.

Also disclosed herein is a method of measuring a gap between an exterior structure and an interior structure of an assembly when the exterior structure is coupled to the interior structure. The method comprises directing a transmitted m-wave signal from an exterior surface of the exterior structure into the exterior structure and the interior structure. The transmitted m-wave signal is generated by a gap sensing device that comprises an electromagnetic dual-tuned resonant coil sensor. The method also comprises measuring a received m-wave signal with the gap sensing device. The received m-wave signal comprises the transmitted m-wave signal influenced by the assembly. The method further comprises determining a size of the gap between the exterior structure and the interior structure based at least partially on at least one measured characteristic of the received m-wave signal. The preceding subject matter of this paragraph characterizes example 11 of the present disclosure.

The method further comprising marking a gap indicia of the gap on the exterior surface of the exterior structure by the gap sensing device. The preceding subject matter of this paragraph characterizes example 12 of the present disclosure, wherein example 12 also includes the subject matter according to example 11, above.

The step of directing a transmitted m-wave signal from an exterior surface of the exterior structure into the exterior structure and the interior structure further comprises moving the gap sensing device along the exterior surface of the exterior structure as the transmitted m-wave signal is directed from the exterior surface of the exterior structure into the exterior structure and the interior structure. The step of measuring a received m-wave signal with the gap sensing device comprises measuring a plurality of received m-wave signals with the gap sensing device as the gap sensing device is moved along the exterior surface of the exterior structure. Each received m-wave signal of the plurality of received m-wave signals corresponds with one location of a plurality of locations on the assembly. The step of determining a size of the gap between the exterior structure and the interior structure based at least partially on at least one measured characteristic of the received m-wave signal additionally comprises determining the size of the gap at each location of the plurality of locations based on a corresponding received m-wave signal of the plurality of received m-wave signals. The preceding subject matter of this paragraph characterizes example 13 of the present disclosure, wherein example 13 also includes the subject matter according to any one of examples 11-12, above.

The method further comprising creating a map of the gaps in the assembly using the location of the plurality of locations for each received m-wave signal of the plurality of received m-wave signals. The preceding subject matter of this paragraph characterizes example 14 of the present disclosure, wherein example 14 also includes the subject matter according to example 13, above.

The method additionally comprising projecting a projected image of the map of the gaps onto the exterior surface of the exterior structure. The preceding subject matter of this paragraph characterizes example 15 of the present disclosure, wherein example 15 also includes the subject matter according to example 14, above.

The method also comprising forming a shim to fill the gap when the size of the gap is more than a predetermined threshold and identified as an unacceptable gap. The method further comprising locating the gap using the projected image of the map of the gaps on the exterior surface of the exterior structure. The method additionally comprising securing the shim in the gap between the exterior structure and the interior structure of the assembly. The preceding subject matter of this paragraph characterizes example 16 of the present disclosure, wherein example 16 also includes the subject matter according to example 15, above.

The method further comprises directing a plurality of M-wave signals from an exterior surface of the exterior structure into the exterior structure and the interior structure. The plurality of M-wave signals are generated by the gap sensing device as the gap sensing device is moved along the exterior surface of the exterior structure. The gap sensing device comprises an electromagnetic dual-tuned resonant coil sensor. The method also comprises measuring a plurality of received m-wave signals with the gap sensing device. Each received m-wave signal of the plurality of received m-wave signals corresponds with one location of a plurality of locations on the assembly and the received m-wave signal comprises a corresponding M-wave signal of the plurality of M-wave signals influenced by the assembly. The method further comprises comparing calibration data with at least one measured characteristic of the received m-wave signal for each received m-wave signal of the plurality of received m-wave signals. The method further comprises determining a size of the gap between the exterior structure and the interior structure at the one location for each received m-wave signal of the plurality of received m-wave signals based at least partially on the comparison between the calibration data and the at least one measured characteristic of the received m-wave signal. The method additionally comprises creating a map of the gaps in the assembly using the one location of the plurality of locations for each received m-wave signal of the plurality of received m-wave signals. The preceding subject matter of this paragraph characterizes example 17 of the present disclosure.

The method further comprising analyzing the map of the gaps to determine at least one of a predicted performance of the assembly and/or at least one change to a manufacturing process of the assembly. The preceding subject matter of this paragraph characterizes example 18 of the present disclosure, wherein example 18 also includes the subject matter according to example 17, above.

Further disclosed herein is a system for measuring a gap between an exterior structure and an interior structure of an assembly. the exterior structure is coupled to the interior structure. The system includes a gap sensing device comprising an electromagnetic dual-tuned resonant coil sensor configured to generate a transmitted m-wave signal, direct the transmitted m-wave signal into the assembly, and measure at least one characteristic of a received m-wave signal that exits the assembly and corresponds with the transmitted m-wave signal. The system also includes a gap determination module configured to determine a size of the gap between the exterior structure and the interior structure based at least partially on the at least one characteristic of the received m-wave signal. The preceding subject matter of this paragraph characterizes example 19 of the present disclosure.

The system additionally includes a test assembly. The gap sensing device is further configured to generate a second M-wave signal, direct the second M-wave signal into the test assembly, and measure at least one characteristic of a received second M-wave signal that exits the test assembly and corresponds with the second M-wave signal. The system further includes a calibration module configured to generate calibration data based on the at least one characteristic of the received second M-wave signal. The gap determination module is configured to determine the size of the gap based on a comparison between the calibration data and the at least one characteristic of the received m-wave signal. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1A:
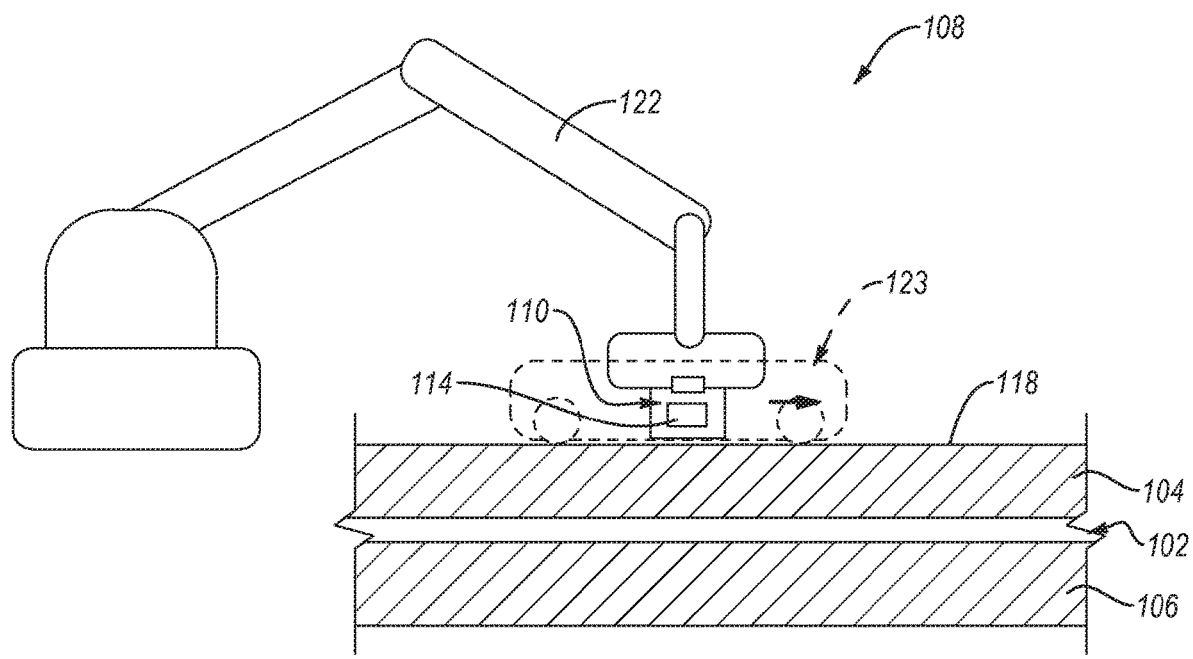
FIG. 1A is a schematic cross-sectional side view of an assembly with a gap between an exterior structure and an interior structure and a gap sensing device on the exterior surface of the assembly, according to one or more examples of the present disclosure.

Referring to FIG. 1A, and according to some examples, an assembly 108 includes an exterior structure 104, an interior structure 106, and a gap 102. A gap sensing device 110 is adjacent an exterior surface 118 of the exterior structure 104. The gap sensing device 110 is an electromagnetic dual-tuned resonant coil sensor 114. In some examples, the gap sensing device 110 is attached to a robotic arm 122 or a crawling robot 123. The robotic arm 122 or crawling robot 123 are capable of autonomously moving the gap sensing device 110 along the exterior surface 118 of the assembly 108.

The exterior structure 104 is made of any of various materials including, but not limited to, a composite material (e.g., fiber-reinforced plastic), metal, or plastic. Likewise, the interior structure 106 is made of any of various materials including, but not limited to, a composite material, metal, or plastic. In certain examples, the assembly 108 is a composite assembly made of a composite material. For example, in some implementations, the exterior structure 104 of the assembly 108, which can be an aircraft wing, is a composite skin, and the interior structure 106 of the assembly 108 is a composite substructure, such as a composite spar. Alternatively, in some examples, the assembly 108 is a composite-metal assembly. For example, in certain implementations, the exterior structure 104 of the assembly 108 is a composite skin and the interior structure 106 of the assembly 108 is a metal substructure, such as an aluminum or steel rib. Furthermore, in some examples, the assembly 108 is a metal-metal assembly where both the exterior structure 104 and the interior structure 106 are made of a metal.

In some situations, the interior structure 106 of the assembly 108 is inaccessible to the gap sensing device 110 or a technician. However, in other situations, it may be possible to access an interior surface of the interior structure 106. For example, in an aircraft wing, a technician may be able to access the interior of the wing and use the gap sensing device 110 from the interior structure 106 of the assembly 108. For clarity, as used herein, the exterior structure 104 of the assembly 108 refers to the structure with a surface directly adjacent the gap sensing device 110 (e.g., the surface on which the gap sensing device 110 travels when inspecting the assembly 108) and the interior structure 106 refers to the structure that is opposite the exterior structure 104 across the gap 102. Accordingly, although the interior structure 106 may define an interior of an assembly 108, in some examples, the interior structure 106 does not define the interior of the assembly and may be accessible via an exterior of the assembly 108 (e.g., the interior structure 106 could have a surface that defines an exterior surface of an assembly 108). In other words, the exterior structure 104 and the interior structure 106 can be interchangeable.

Figure 2A:
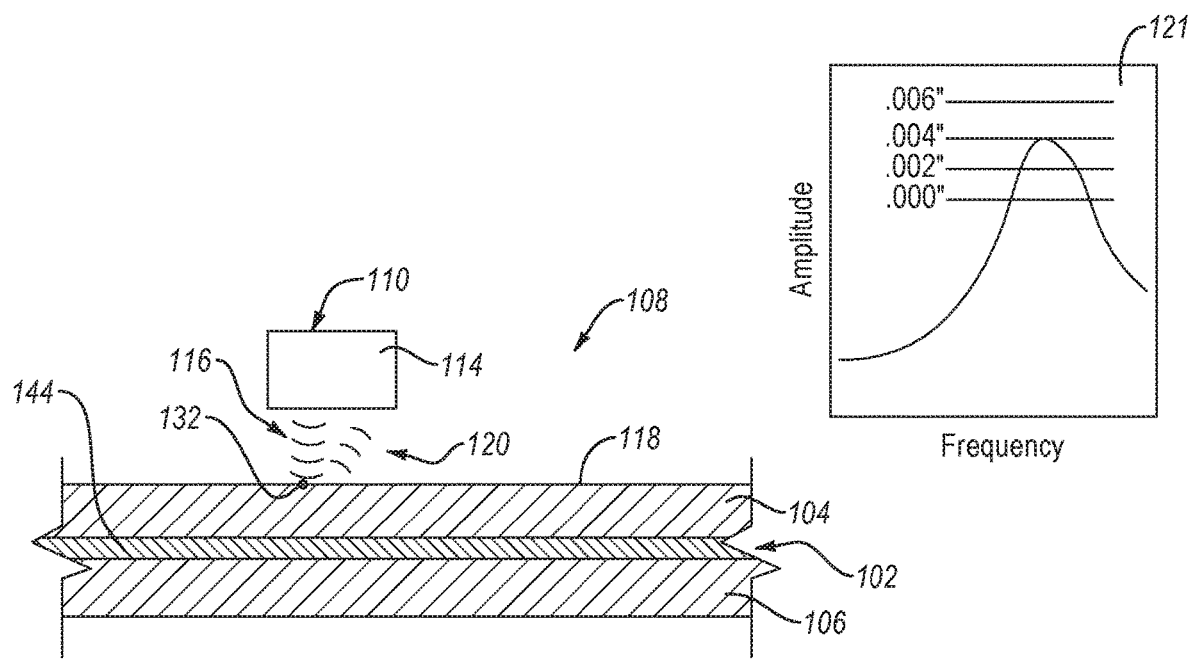
FIG. 2A is a schematic cross-sectional side view a gap sensing device measuring a gap between an exterior structure and an interior structure of an assembly, according to one or more examples of the present disclosure.
Figure 2B:
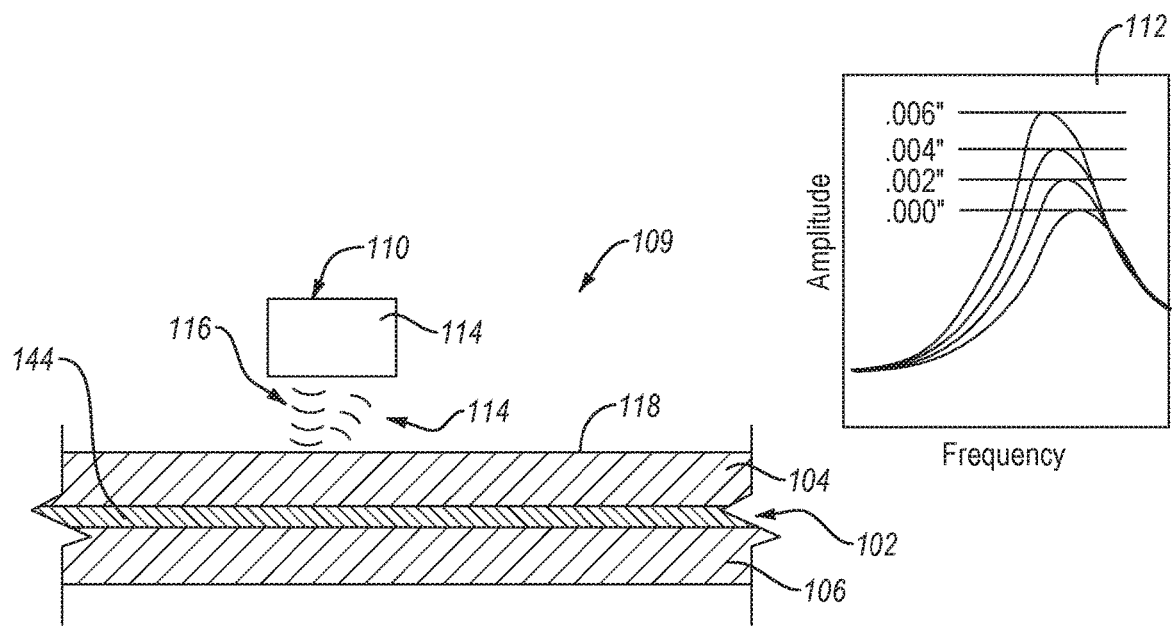
FIG. 2B is a schematic cross-sectional side view of a gap sensing device measuring a gap between an exterior structure and an interior structure of a test assembly, according to one or more examples of the present disclosure.

In FIG. 1A, the gap 102 is an empty void filled with air or other gas (i.e., the gap is a non-occupied open space between two structures). Alternatively, in some examples, as shown in FIGS. 2A and 2B, the gap 102 is filled with a substance 144 or material, such as a resin, adhesive, or sealant. Although the gap 102 in FIG. 1A is shown to be uniform along the assembly 108, in some examples, the gap 102 between the exterior structure 104 and the interior structure 106 is non-uniform or varies along the assembly 108. For example, in actual practice, the gap 102 may have varied distances (e.g. tapered or curved) between the exterior structure 104 and the interior structure 106.

Figure 1B:
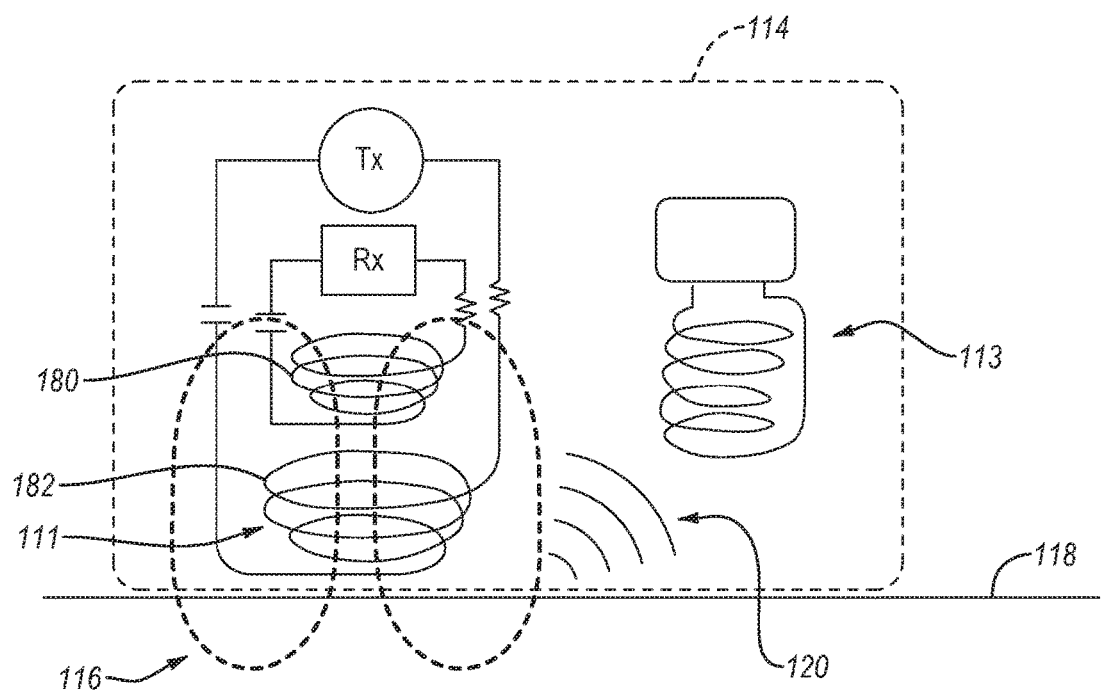
FIG. 1B is a schematic view of the gap sensing device of FIG. 1A, according to one or more examples of the present disclosure.

The electromagnetic dual-tuned resonant coil sensor 114, according to one example, is shown in FIG. 1B. The electromagnetic dual-tuned resonant coil sensor 114 includes transmitting coils 111 and a receiving coil 113. The transmitting coils 111 resonate at a fixed or series of resonant frequencies. When an electro motive force (EMF) is induced to the transmitting coils 111, the transmitting coils 111 cooperatively generate an electromagnetic field, which oscillates relative to the frequency applied, to form a transmitted m-wave signal 116. The transmitted m-wave signal 116 passes into the assembly 108 and is intercepted by the receiving coil 113 after passing through or being received from assembly 108 in the form of a received m-wave signal 120. The receiving coil 113 also resonates at a frequency or series of frequencies corresponding with the configuration (e.g., size) of the gap 102, among other characteristics of the assembly 108, such as the thicknesses and material properties of the exterior structure 104 and the interior structure 106. Both the transmitting coils 111 and the receiving coil 113 can be tuned to the same resonant frequency, or can be tuned to differing frequencies.

Referring to FIG. 1B, the transmitting coils 111 includes a first coil 180 and a second coil 182. The first coil 180 and the second coil 182 are tuned to produce the transmitted m-wave signal 116. The first coil 180 and the second coil 182 are tuned by selecting desired resistance and capacitance values for the resistors and the capacitors of the electrical circuits corresponding with the first coil 180 and the second coil 182. In some examples, the first coil 180 and the second coil 182 are concentric. Generally, each wave (or resonance peak) of the transmitted m-wave signal 120 has an M-shape due to the combination of the electromagnetic fields generated by the first coil 180 and the second coil 182. The waves of the transmitted m-wave signal 116 will shift in amplitude and frequency as the transmitted m-wave signal 116 is directed into a material and the electromagnetic fields interact with and are affected by that material, producing a received m-wave signal 120. The waves of the transmitted m-wave signal 116 will shift due to the characteristics of the assembly 108, including the thickness and material properties of the exterior structure 104 and the interior structure 106. The waves will also shift due to any change in gap thickness, regardless of whether a gap is filled with a substance 144 or gas. In other words, the received m-wave signal 120 is a M-wave signal 116 that has been influenced by the assembly 108. When the gap sensing device 110 is calibrated for the specific characteristics of the assembly 108 (i.e. material properties and thicknesses) at a given location any shifts in the received m-wave signal 120 will be due to the change in the gap thickness at that given location.

Figure 11:
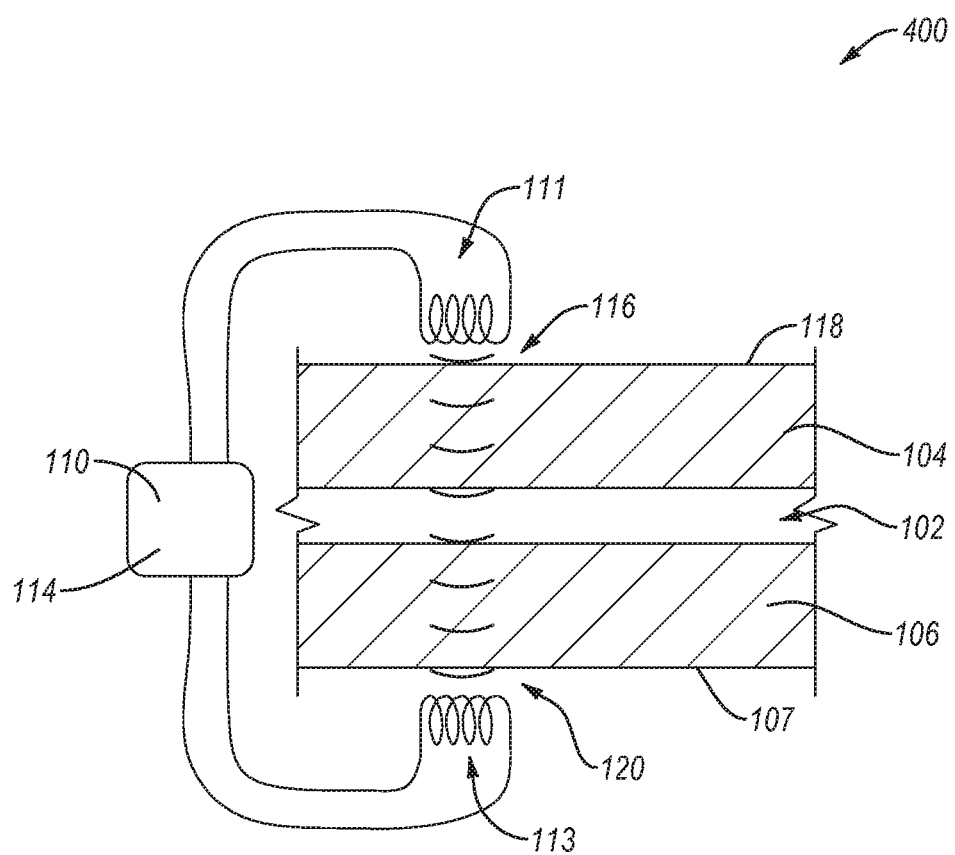
FIG. 11 is a schematic cross-sectional view of a gap sensing device, according to one or more examples of the present disclosure.

The transmitting coil 111 directs a transmitted m-wave signal 116 from the exterior surface 118 of the exterior structure 104 into the exterior structure 104 and the interior structure 106. Accordingly, at least a portion of the transmitted m-wave signal 116 passes through the gap 102. In one example, the transmitted m-wave signal 116 is an oscillating magnetic field which oscillates relative to a specific frequency. The receiving coil 113 receives the received m-wave signal 120. The received m-wave signal 120 is the transmitted m-wave signal 116 that has at least partially passed through the assembly 108. In one example, as shown in FIGS. 1B and 2A, the received m-wave signal 120 is the portion of the transmitted m-wave signal 116 that does not pass through the assembly 108, but is redirected back through the exterior structure 104 and out of the assembly 108. However, in other examples, as shown in FIG. 11, the received m-wave signal 120 is the portion of the transmitted m-wave signal 116 that passes entirely through the assembly 108 and exits out of the assembly 108 through the interior structure 106.

In some examples, the receiving coil 113 is located concentrically with and inside of the transmitting coils 111. In other examples, as shown in FIGS. 1B and 11, the transmitting coils 111 and the receiving coil 113 are separate from each other. For example, as shown in FIG. 1B, the receiving coil 113 is separate from the transmitting coils 111 and located on the same side of the assembly 108 as the transmitting coils 111. In contrast, as shown in FIG. 11, in certain examples the receiving coil 113 is separate from the transmitting coils 111, but located adjacent the interior surface 107 of the interior structure 106 or on the opposite side of the assembly 108. The configuration of the transmitting coils 111 and the receiving coil 113, on opposite sides of the assembly 108, can be useful in an assembly 108 where simultaneous access to both the exterior surface 118 and the interior surface 107 is possible.

Referring to FIG. 2A, the gap sensing device 110 is directing a M-wave signal 116 from the exterior surface 118 of the exterior structure 104 into the exterior structure 104 and the interior structure 106. A received m-wave signal 120 is measured by the gap sensing device 110. The transmitted m-wave signal 116 and received m-wave signal 120 are tied to a specific location 132 on the exterior surface 118 of the assembly 108 corresponding with the location of the gap sensing device 110 relative to the assembly 108. Accordingly, the specific location 132 can be determined based on the location of the gap sensing device 110, which can be autonomously tracked using sensors.

In view of the foregoing, the received m-wave signal 120 is the transmitted m-wave signal 116 after the transmitted m-wave signal 116 passes through the assembly 108 at the specific location 132. The received m-wave signal 120 can be represented by at least one measured characteristic 121. The measured characteristic 121 of the received m-wave signal 120 may be any of various characteristics of the signal including, but not limited to, amplitude, bandwidth, Q-values, or frequency of the peaks and phases of the signal. If the measured characteristic 121 of the received m-wave signal 120 is the signal amplitude, the amplitude may be measured in volts output based on the frequency of the received m-wave signal 120. The size of the gap 102 affects the measured characteristics 121 of the received m-wave signal 120. Determining the size of a gap 102 between the exterior structure 104 and the interior structure 106 is based at least partially on at least one measured characteristic 121 of the received m-wave signal 120. For example, if an assembly 108 having a gap 102 with a known size of 0.004 inches produces a specific signal amplitude and a second assembly with the same specifications but an unknown gap size produces the same signal amplitude then the gap 102 in the second assembly is 0.004 inches.

Referring to FIG. 2B, calibration data 112 can be compared to at least one measured characteristic of the received m-wave signal 120 to determine the size of a gap 102. In one example, the calibration data 112, for comparing to the received m-wave signal 120, is obtained using a test assembly 109. As shown in FIG. 2B, the gap sensing device 110 is directing a test M-wave signal 117 from the exterior surface 118 of the exterior structure 104 into the exterior structure 104 and the interior structure 106 of a test assembly 109. The test assembly 109 is configured to replicate the material and size of both the exterior structure 104 and the interior structure 106 of the assembly 108; however, the gap 102 in the test assembly 109 has a known size. Since the test assembly 109 has a gap 102 with a known or predetermined size, the received test M-wave signal 119 can be associated with the gap 102 of that known predetermined size. The test assembly 109 can be used to measure a test M-wave signal 117 through gaps 102 having any number of known sizes in order to obtain calibration data 112 for the gap 102 sizes that may be found in the assembly 108. In one example, the process of measuring received test M-wave signals 119 can be repeated using every possible combination of material and material thickness of both the exterior structure 104 and the interior structure 106 that may be used in an assembly 108 with the gap 102 having a predetermined known size. In another example, the process of measuring received test M-wave signals 119 can be repeated with gaps 102 having a known predetermined size but with the gap 102 filled with different substances. For example, the gap 102 may be filled with air or another gas or may be filled with a resin or sealant. The calibration data 112 obtained influenced by the test assembly 109 can be saved and the data organized into charts for use in any future testing of an assembly 108.

Figure 3:
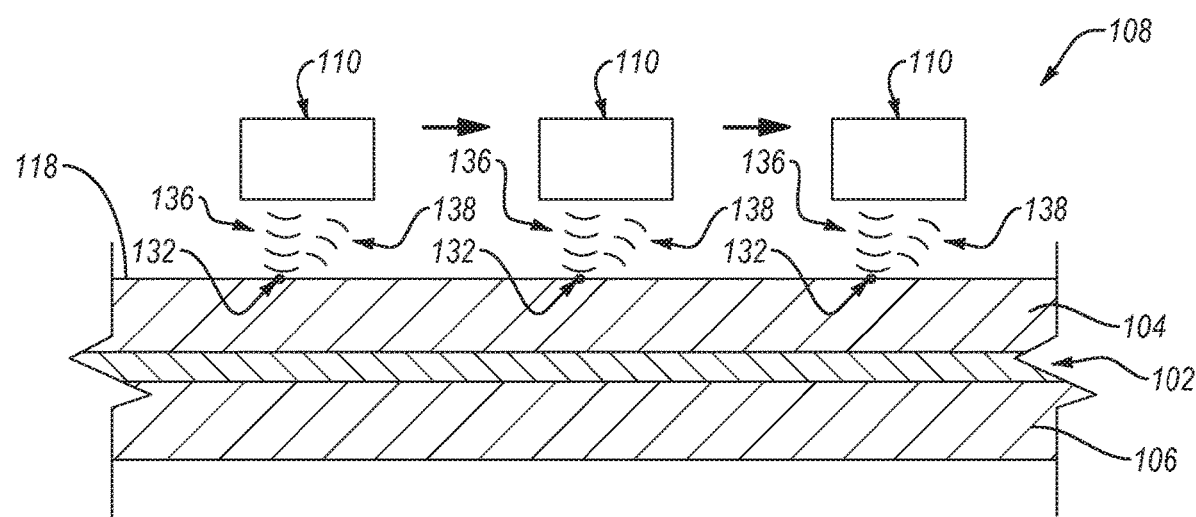
FIG. 3 is a schematic cross-sectional side view of a gap sensing device moving along the exterior surface of an assembly as the gap sensing device is measuring a gap between an exterior structure and an interior structure of the assembly, according to one or more examples of the present disclosure.

Referring to FIG. 3, in one example, the gap sensing device 110 is moved along the exterior surface 118 of the exterior structure 104. The gap sensing device 110 may be moved manually by a technician or by a robot, such as a robotic arm 122 or a crawling robot 123. Since the gap sensing device 110 is on the exterior surface 118 of the assembly 108 the exterior surface 118 is accessible to a technician or robot. In some examples, the gap sensing device 110 may also be used on the interior structure 106 of the assembly 108, if the interior structure 106 is accessible to a technician or robot.

In one example, the gap sensing device 110 is directing a plurality of transmitted M-wave signals 136 and measuring a plurality of received m-wave signals 138 as the gap sensing device 110 is moved along the exterior surface 118 of the exterior structure 104. Each transmitted M-wave signal 116 and corresponding received m-wave signal 120 of the plurality of signals are tied to a specific location 132 along the exterior surface 118 of the exterior structure 104. Therefore, the received m-wave signal 120 will represent the gap 102 at the specific location 132. With the ability to move the gap sensing device 110 along the exterior surface 118 of the exterior structure 104 it is possible to obtain numerous measurements at numerous locations 132 in close proximity. These measurements can lead to a more detailed and accurate depiction of a gap 102 than would be possible for a technician using manual methods, such as using feeler gauges. In one example, the transmitted m-wave signal 116 can be directed from the gap sensing device 110 at a specified rate as the gap sensing device 110 is moved along the exterior surface 118. Alternatively, the transmitted m-wave signal 116 can be directed from the gap sensing device 110 at predefined locations along the exterior surface 118 of the exterior structure 104.

In one example, the gap sensing device 110 may be configured to automatically apply the corresponding calibration data 112 based on the assembly specifications. If any changes occur to the exterior structure 104 or interior structure 106 the corresponding calibration data 112 may be updated automatically. Therefore, the gap sensing device 110 may be moved along the exterior surface 118 of the assembly without the need stop and recalibrate the gap sensing device 110 when the assembly specifications change.

Figure 4:
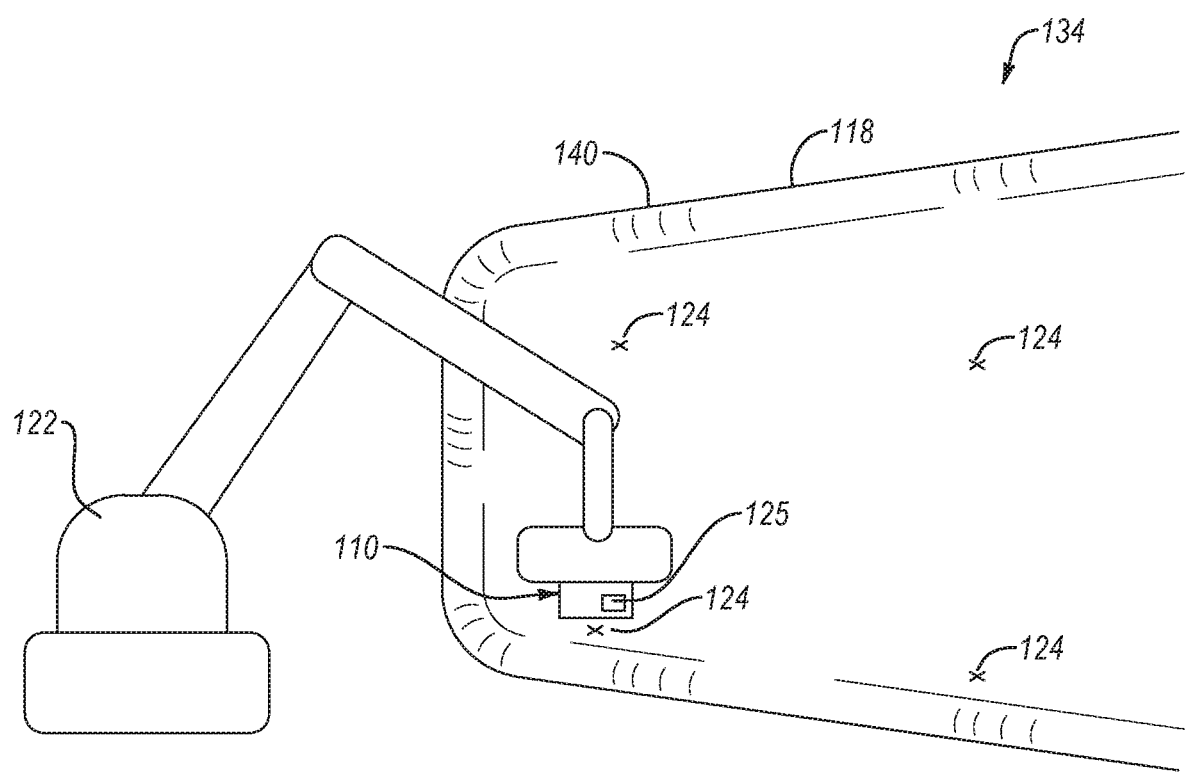
FIG. 4 is a schematic perspective view of a gap sensing device on the exterior surface of an assembly, according to one or more examples of the present disclosure.

In FIG. 4, according to one example, a composite skin 140 of an assembly 134, in the form of an aircraft assembly, is shown. The gap sensing device 110 is attached to the robotic arm 122 to be located adjacent the exterior surface 118 of the composite skin 140. The gap sensing device 110 includes an indicia applicator 125, which is configured to apply gap indicia 124, corresponding with a gap 102, on the exterior surface 118 of the composite skin 140. Accordingly, in some examples, the gap sensing device 110 includes marking capability in the form of the indicia applicator 125, which can be a sticker applicator, an ink applicator, or other indicia applicator. The gap indicia 124 is used to indicate that there is a gap 102 between the exterior structure 104 and the interior structure 106 at the gap indicia location on the exterior surface 118. In one example, the gap indicia 124 is used to mark gaps 102 that are unacceptable, such as when the measured size of the gap 102 is larger than a predetermined threshold. In another example, the gap indicia 124 is used to mark any gaps 102 including gaps that are acceptable and unacceptable based on a predetermined threshold. The gap indicia 124 may be a simple mark, such as a line or 'x', indicating that there is a gap 102 between the exterior structure 104 at the interior structure 106 at the gap indicia location. Alternatively, the gap indicia 124 may contain details about the gap 102 including but not limited to, the width, length, or size of the gap 102. Moreover, the gap indicia 124 may be an outline of the gap 102 or a gray-scale image of the gap 102 indicating gap size. The gap indicia 124 may be useful to a technician placing shims within gaps 102 in the assembly 134.

Figure 5:
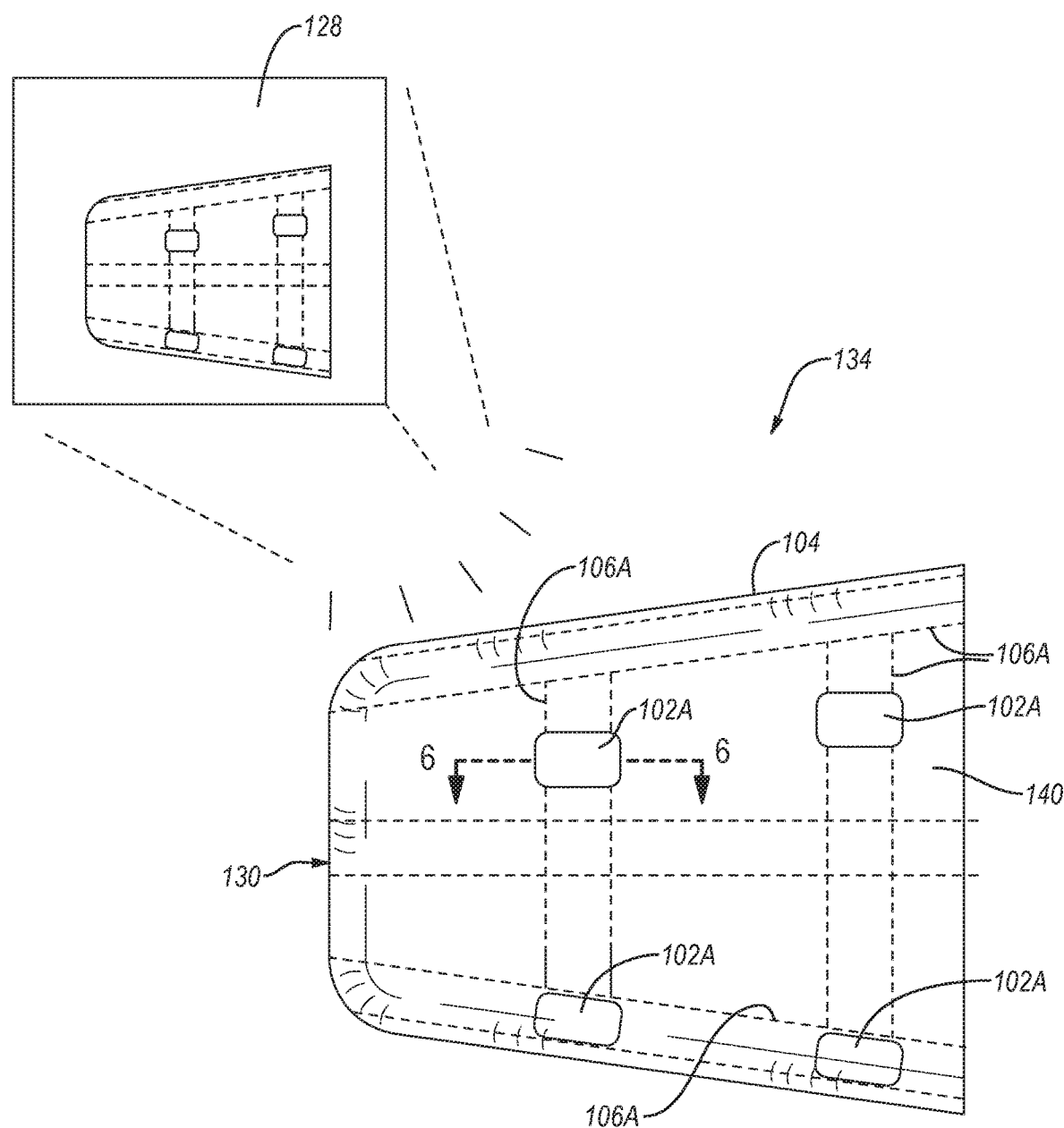
FIG. 5 is a schematic view of an assembly with a projected image of a map of the gaps projected onto an exterior surface of the assembly, according to one or more examples of the present disclosure.

According to FIG. 5, in another example, a map 128 of the gaps 102 in the assembly 134 is created. The map 128 of the gaps 102 is created using the gap data generated from the gap sensing device 110. The map 128 may be a hand-drawn map based on the gap data or the map 128 may be computer generated. The map 128 may have simples mark, such as a line or x, indicating the location of a gap 102. Alternatively, the map 128 may be an outline of one or more gaps 102, gray-scale image of one or more gaps 102, or a topographical image of one or more gaps 102. Additionally, the map 128 may contain details about the gaps 102 including but not limited to, the width, length, or size of the gap 102. The map 128 can be laid over the outer surface of the assembly (e.g., the outer surface of the composite skin 140) to provide a visual indication of where gaps are located in the assembly.

According to alternative examples, an image 130 of the map 128 of the gaps 102 is projected onto the exterior surface 118 of the exterior structure 104. The projection of the image 130 of the map 128 may be helpful in cases where the exterior surface 118 is relatively flat. In one example, the map 128 also includes details about the interior structure 106, such as an outline 106A of the interior structure 106 and outlines 102A of the gaps 102. In one example, the interior structure 106 is the metal substructure of an aircraft wing. The projection of the outline 106A of the interior structure 106 and the map 128 of the gaps 102 may assist a technician when locating gaps 102 within the assembly 134.

Figure 6:
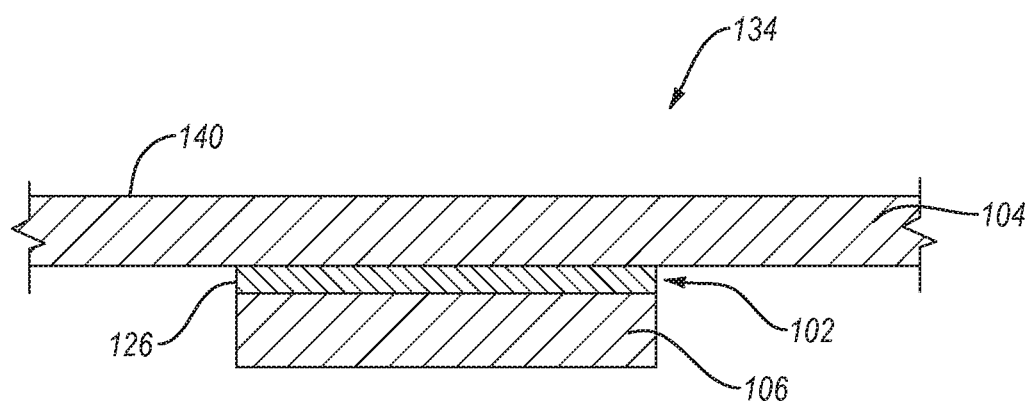
FIG. 6 is a schematic cross-sectional side view of a gap of FIG. 5, taken along the line 6-6 of FIG. 5, where the gap is filled with a shim, according to one or more examples of the present disclosure.

In some cases, a shim may be used to fill a gap 102. For example, a shim may be used if the size of a gap 102 is more than a predetermined threshold. As shown in FIG. 6, a shim 126 is located within the gap 102 between the exterior structure 104 and the interior structure 106. In one example, the size of the shim 126 is determined by using the gap data generated by the gap sensing device 110. The shim 126 can be produced by any method known in the art, including but not limited to, a shim cutter or a 3D printer. Furthermore, in some examples, the shim 126 is automatically produced when the size of a gap 102 is more than a predetermined threshold.

Figure 7:
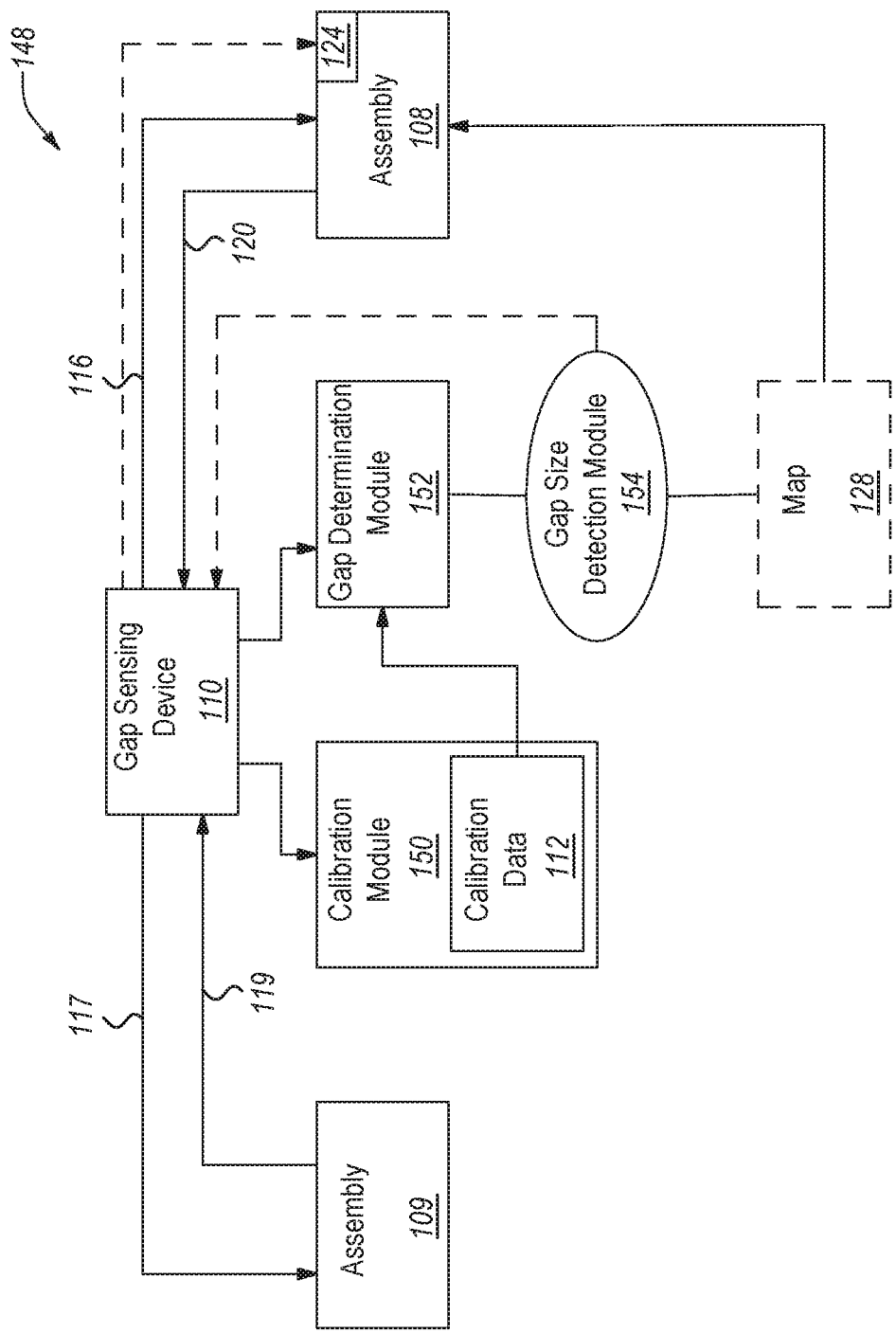
FIG. 7 is a schematic flow diagram of a system for measuring a gap between an exterior structure and an interior structure of an assembly, according to one or more examples of the present disclosure.

Referring to FIG. 7, according to some examples, a system 148 for measuring a gap 102 between an exterior structure 104 and an interior structure 106 of an assembly 108 is shown. The system 148 includes the gap sensing device 110. The gap sensing device 110 directs test signals, such as test M-wave signals 117, to the test assembly 109 and measures received test M-wave signals 119 influenced by the test assembly 109. Using the received test M-wave signals 119, a calibration module 150 of the system 148 produces the calibration data 112. Additionally, the gap sensing device 110 is configured to direct M-wave signals 116 to the assembly 108 and measure received m-wave signals 120 influenced by the assembly 108. A gap determination module 152 of the system 148 compares the calibration data 112 with at least one measured characteristic 121 of the received m-wave signal 120. The gap determination module 152 identifies gaps 102 and generates a gap size determination 154 at least partially based on the comparison from the gap determination module 152. After the gaps 102 in the assembly 108 have been identified, a map 128 of the gaps 102 is created in some examples. The map 128 can be physical or virtual.

Figure 8:
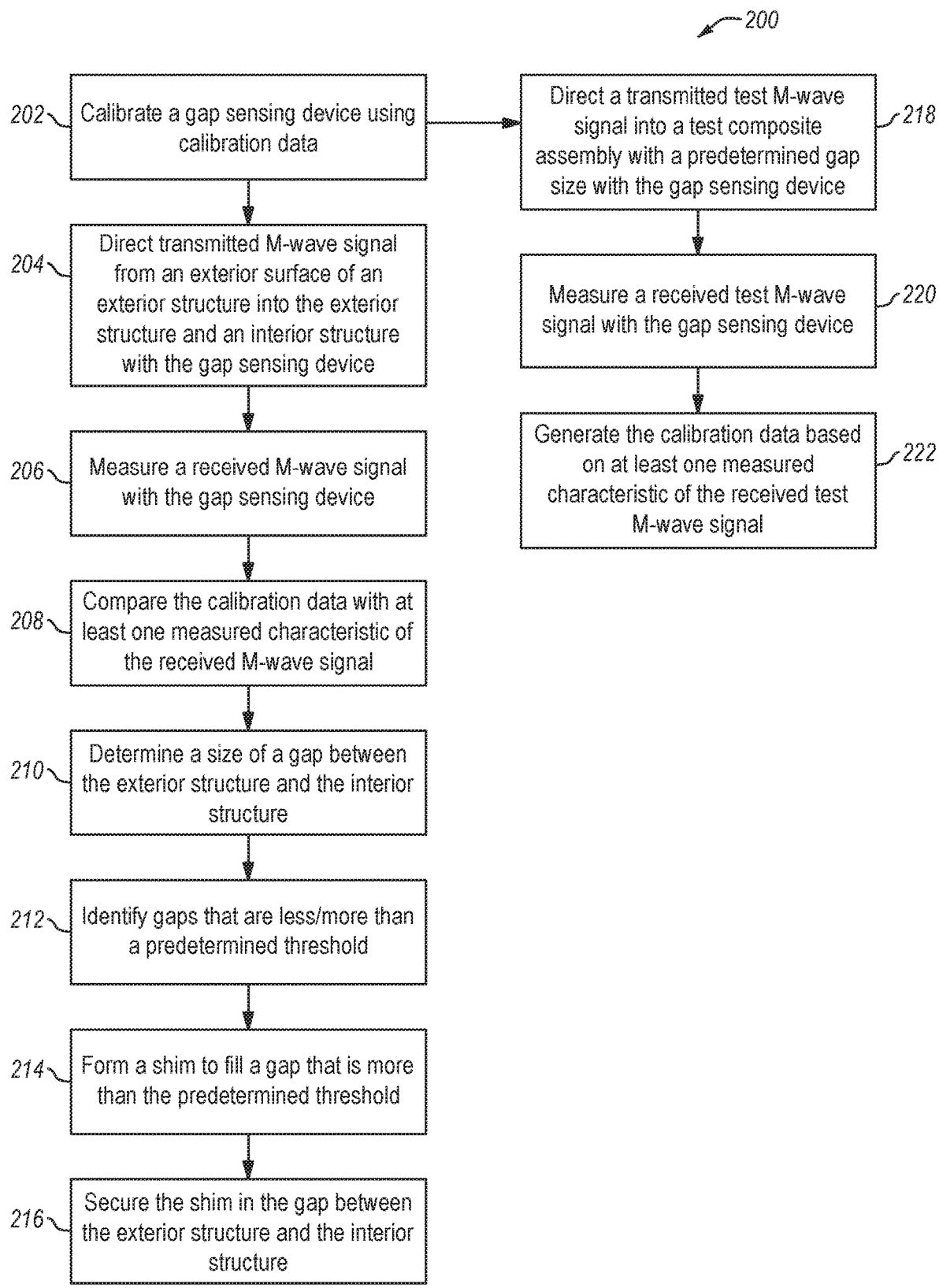
FIG. 8 is a schematic flow diagram of a method of measuring a gap between an exterior structure and an interior structure of an assembly, according to one or more examples of the present disclosure.

Now referring to FIG. 8, according to certain examples, a method 200 of measuring a gap 102 between an exterior structure 104 and an interior structure 106 of an assembly 108 is shown. The method 200 includes (block 202) calibrating a gap sensing device 110 using calibration data 112. The gap sensing device 110 is an electromagnetic dual-tuned resonant coil sensor 114 in some examples. The method also includes (block 204) directing a transmitted m-wave signal 116 from an exterior surface 118 of the exterior structure 104 into the exterior structure 104 and the interior structure 106. The transmitted m-wave signal 116 is generated by the gap sensing device 110. The method also includes (block 206) measuring a received m-wave signal 120 with the gap sensing device 110. The received m-wave signal 120 is the transmitted m-wave signal 116 influenced by the assembly 108. The method further includes (block 208) comparing the calibration data 112 with a measured characteristic 121 of the received m-wave signal 120. The method additionally includes (block 210) determining a size of the gap 102 between the exterior structure 104 and the interior structure 106 based at least partially on the comparison between the calibration data 112 and the measured characteristic 121 of the received m-wave signal 120.

In certain examples of the method 200, block 202 further includes (block 218) directing a test M-wave signal 117 generated by the gap sensing device 110 into a test assembly 109 configured to replicate the assembly 108 but with the gap 102 between the exterior structure 104 and the interior structure 106 to have a predetermined size. The step also includes (block 220) measuring a received test M-wave signal 119 with the gap sensing device 110, the received test M-wave signal 119 comprising the test M-wave signal 117 influenced by the test assembly 109. The step further includes (block 222) generating the calibration data 112 based on at least one measure characteristic 121 of the received test M-wave signal 119.

In one example, the method 200 further includes (block 212) identifying the assembly 108 as acceptable when the size of the gap 102 is less than a predetermined threshold and as unacceptable when the size of the gap 102 is more than a predetermined threshold. The calibration data 112 may include the predetermined threshold. If the size of the gap 102 is unacceptable because it is more than a predetermined threshold the method 200 may also include (block 214) forming a shim 126 to fill the gap 102. The shim 126 is sized based on the size of the gap 102. The method also includes (block 216) locating the shim 126 in the gap 102 between the exterior structure 104 and the interior structure 106. In some examples, the method 200 could also be used to verify that shims 126 are not helpful in an assembly 108.

Figure 9:
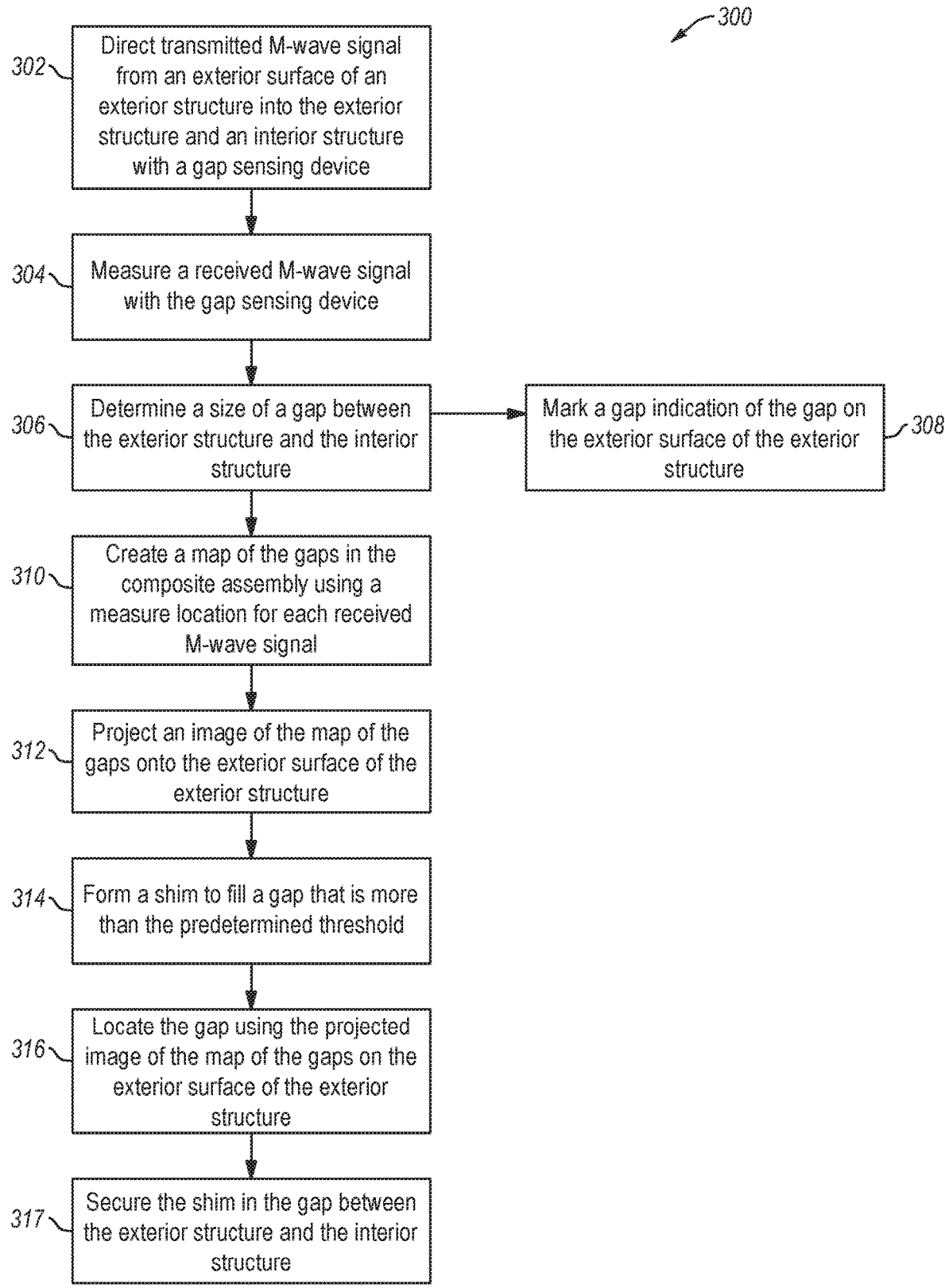
FIG. 9 is a schematic flow diagram of another method of measuring a gap between an exterior structure and an interior structure of an assembly, according to one or more examples of the present disclosure.

Now referring to FIG. 9, according to certain examples, a method 300 of measuring a gap 102 between an exterior structure 104 and an interior structure 106 of an assembly 108 when the exterior structure 104 is coupled to the interior structure 106 is shown. The method includes (block 302) directing a transmitted m-wave signal 116 from an exterior surface 118 of the exterior structure 104 into the exterior structure 104 and the interior structure 106. The transmitted m-wave signal 116 is generated by a gap sensing device 110 that is an electromagnetic dual-tuned resonant coil sensor 114. The method also includes (block 304) measuring a received m-wave signal 120 with the gap sensing device 110. The received m-wave signal 120 is the transmitted m-wave signal 116 influenced by the assembly 108. The method further includes (block 306) determining a size of the gap 102 between the exterior structure 104 and the interior structure 106 based at least partially on at least one measured characteristic 121 of the received m-wave signal 120.

In some examples, the method 300 further includes (block 308) marking a gap indicia 124 of the gap 102 on the exterior surface 118 of the exterior structure 104 by the gap sensing device 110. Alternatively, or additionally, the method includes (block 310) creating a map 128 of the gaps 102 in the assembly 108 using the location 132 of the plurality of locations for each received m-wave signal 120 of the plurality of received m-wave signals 138. The method also includes (block 312) projecting an image 130 of the map 128 of the gaps 102 onto the exterior surface 118 of the exterior structure 104.

In certain example, method 300 further includes (block 314) forming a shim 126 to fill the gap 102 when the size of the gap 102 is more than a predetermined threshold and identified as an unacceptable gap or a gap 102 having an unacceptable size. The method further includes (block 316) locating the gap 102 using the projected image 130 of the map 128 of the gaps 102 on the exterior surface 118 of the exterior structure 104. The method additionally includes (block 318) securing the shim 126 in the gap 102 between the exterior structure 104 and the interior structure 106 of the assembly 108.

Figure 10:
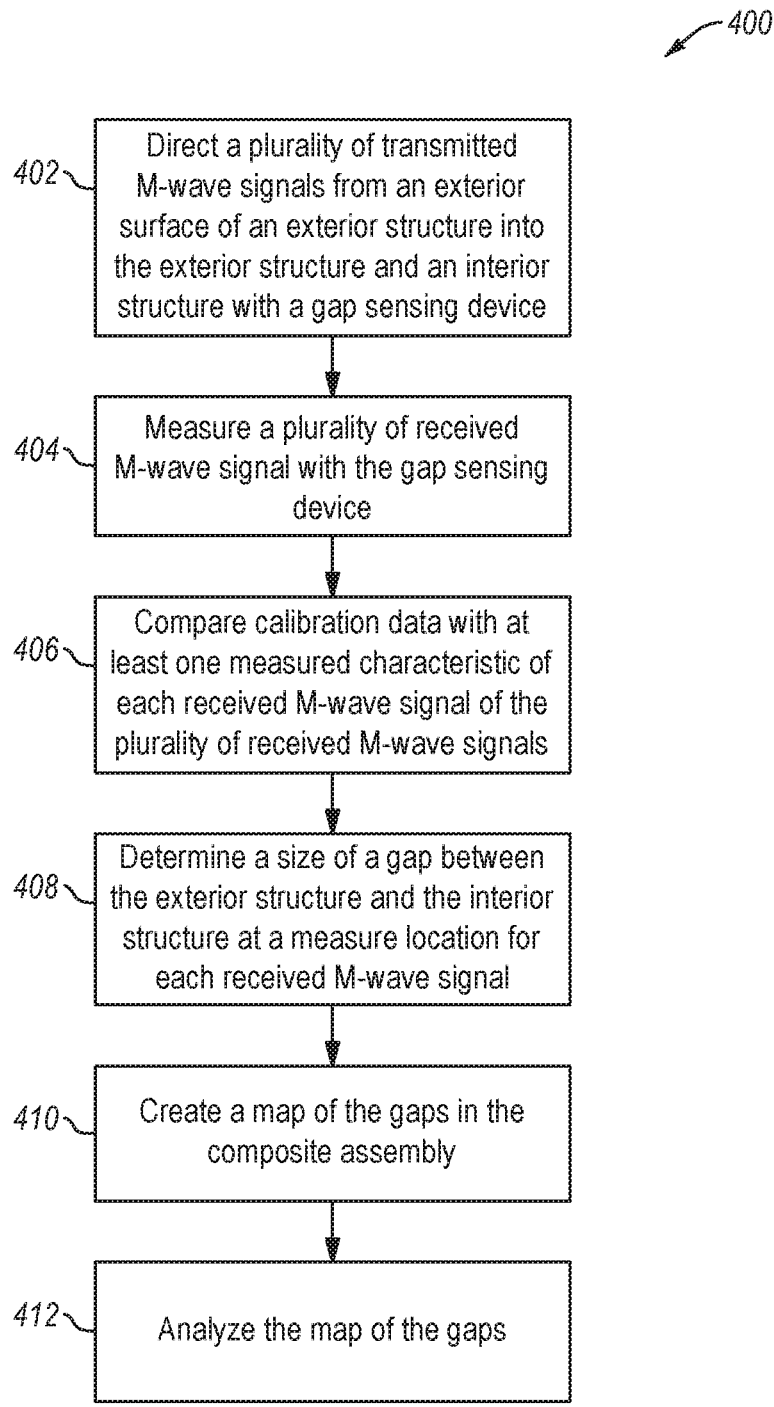
FIG. 10 is a schematic flow diagram of an additional method of measuring a gap between an exterior structure and an interior structure of an assembly, according to one or more examples of the present disclosure.

Now referring to FIG. 10, according to some examples, a method 400 measuring gaps 102 between an exterior structure 104 and an interior structure 106 of an assembly 108 is shown. The method includes (block 402) directing a plurality of M-wave signals 136 from an exterior surface 118 of the exterior structure 104 into the exterior structure 104 and the interior structure 106. The plurality of M-wave signals 136 are generated by a gap sensing device 110 as the gap sensing device 110 is moved along the exterior surface 118 of the exterior structure 104. The gap sensing device 110 is an electromagnetic dual-tuned resonant coil sensor 114. The method 400 also includes (block 404) measuring a plurality of received m-wave signals 138 with the gap sensing device 110. Each received m-wave signal 120 of the plurality of received m-wave signals 138 corresponds with one location 132 of a plurality of locations on the assembly 108 and the received m-wave signal 120 is a corresponding M-wave signal 116 of the plurality of M-wave signals 136 influenced by the assembly 108. In one example, the location 132 of the transmitted m-wave signal 116 is tracked using encoders on the gap sensing device 110. Alternatively, motion capture or other optical positioning methods may be used.

In some examples, the method 400 further includes (block 406) comparing calibration data 112 with at least one measured characteristic 121 of the received m-wave signal 120 for each received m-wave signal 120 of the plurality of received m-wave signals 138. The method further includes (block 408) determining a size of the gap 102 between the exterior structure 104 and the interior structure 106 at the one location 132 for each received m-wave signal 120 of the plurality of received m-wave signals 138 based at least partially on the comparison between the calibration data 112 and the at least one measured characteristic 121 of the received m-wave signal 120. The method additionally includes (block 410) creating a map 128 of the gaps 102 in the assembly 108 using the one location 132 of the plurality of locations for each received m-wave signal 120 of the plurality of received m-wave signals 138.

In certain examples, method 400 further includes (block 412) analyzing the map 128 of the gaps 102. The analysis can be used to predict performance of the assembly 108. This analysis may be used to determine if the assembly 108 can be used as is or if shims are helpful. Additionally, the analysis can be used to determine if changes need to the made in the manufacturing process of the assembly 108. Changes in the manufacturing process (e.g. tooling changes) of an assembly 108 could help to produce an assembly 108 with fewer gaps 102 or smaller gaps 102.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method of measuring a gap between an exterior structure and an interior structure of an assembly, wherein the exterior structure is coupled to the interior structure and the method comprises:
    calibrating a gap sensing device using calibration data, wherein the gap sensing device comprises an electromagnetic dual-tuned resonant coil sensor;
    directing a transmitted m-shaped signal from an exterior surface of the exterior structure into the exterior structure and the interior structure, wherein the transmitted m-shaped signal is generated by the gap sensing device;
    measuring a received m-shaped signal with the gap sensing device, wherein the received m-shaped signal comprises the transmitted m-shaped influenced by the assembly;
    comparing the calibration data with at least one measured characteristic of the received m-shaped signal; and
    determining a size of the gap between the exterior structure and the interior structure based at least partially on the comparison between the calibration data and the at least one measured characteristic of the received m-shaped signal.

2. The method according to claim 1, wherein the step of calibrating the gap sensing device using the calibration data comprises:
    directing a test m-shaped signal generated by the gap sensing device into a test assembly configured to replicate the assembly but with the gap between the exterior structure and the interior structure to have a predetermined size, wherein the test m-shaped signal is generated by the gap sensing device;
    measuring a received test m-shaped signal with the gap sensing device, wherein the received test m-shaped signal comprises the test m-shaped signal influenced by the test assembly; and
    generating the calibration data based on at least one measured characteristic of the received test M m-shaped signal.

3. The method according to claim 1, wherein the calibration data comprises at least one characteristic of the received m-shaped signal representing the received m-shaped signal if the gap between the exterior structure and the interior structure was a predetermined size.

4. The method according to claim 1, wherein the step of directing the transmitted m-shaped signal from the exterior surface of the exterior structure into the exterior structure and the interior structure comprises moving the gap sensing device along the exterior surface of the exterior structure as the transmitted m-shaped signal is directed from the exterior surface of the exterior structure into the exterior structure and the interior structure.

5. The method according to claim 4, wherein the gap sensing device is moved along the exterior surface of the exterior structure using a robotic arm or a crawling robot.

6. The method according to claim 1, wherein the step of measuring the received m-shaped signal with the gap sensing device comprises measuring the received m-shaped signal with the gap sensing device as the gap sensing device is moved along the exterior surface of the exterior structure.

7. The method according to claim 1, wherein:
the gap sensing device comprises a transmitting coil and a receiving coil;
the step of directing the transmitted m-shaped signal from the exterior surface of the exterior structure into the exterior structure and the interior structure comprises moving the transmitting coil of the gap sensing device along the exterior surface of the exterior structure as the transmitted m-shaped signal is directed from the exterior surface of the exterior structure into the exterior structure and the interior structure; and
the step of measuring the received m-shaped signal with the gap sensing device comprises measuring the received m-shaped signal with the receiving coil of the gap sensing device as the receiving coil is moved along an interior surface of the interior structure.

8. The method according to claim 1, further comprising identifying the assembly as acceptable when the size of the gap is less than a predetermined threshold and as unacceptable when the size of the gap is more than a predetermined threshold, wherein the calibration data comprises the predetermined threshold.

9. The method according to claim 8, further comprising:
forming a shim to fill the gap when the size of the gap is more than the predetermined threshold, wherein the shim is sized based on the size of the gap; and
locating the shim in the gap between the exterior structure and the interior structure.

10. The method according to claim 1, wherein the gap between the exterior structure and the interior structure is filled with a substance.

11. A method of measuring a gap between an exterior structure and an interior structure of an assembly, wherein the exterior structure is coupled to the interior structure, and the method comprises:
directing a transmitted m-shaped signal from an exterior surface of the exterior structure into the exterior structure and the interior structure, wherein the transmitted m-shaped signal is generated by a gap sensing device that comprises an electromagnetic dual-tuned resonant coil sensor;
measuring a received m-shaped signal with the gap sensing device, wherein the received m-shaped signal comprises the transmitted m-shaped signal influenced by the assembly; and
determining a size of the gap between the exterior structure and the interior structure based at least partially on at least one measured characteristic of the received m-shaped signal.

12. The method according to claim 11, further comprising marking a gap indicia of the gap on the exterior surface of the exterior structure by the gap sensing device.

13. The method according to claim 11, wherein:
the step of directing a transmitted m-shaped signal from an exterior surface of the exterior structure into the exterior structure and the interior structure comprises moving the gap sensing device along the exterior surface of the exterior structure as the transmitted m-shaped signal is directed from the exterior surface of the exterior structure into the exterior structure and the interior structure;
the step of measuring a received m-shaped signal with the gap sensing device comprises measuring a plurality of received m-shaped signals with the gap sensing device as the gap sensing device is moved along the exterior surface of the exterior structure, wherein each received m-shaped signal of the plurality of received m-shaped signals corresponds with one location of a plurality of locations on the assembly; and
the step of determining a size of the gap between the exterior structure and the interior structure based at least partially on at least one measured characteristic of the received m-shaped signal comprises determining the size of the gap at each location of the plurality of locations based on a corresponding received m-shaped signal of the plurality of received m-shaped signals.

14. The method according to claim 13, further comprising creating a map of the gaps in the assembly using the location of the plurality of locations for each received m-shaped signal of the plurality of received m-shaped signals.

15. The method according to claim 14, further comprising projecting a projected image of the map of the gaps onto the exterior surface of the exterior structure.

16. The method according to claim 15, further comprising:
forming a shim to fill the gap when the size of the gap is more than a predetermined threshold and identified as an unacceptable gap;
locating the gap using the projected image of the map of the gaps on the exterior surface of the exterior structure; and
securing the shim in the gap between the exterior structure and the interior structure of the assembly.

17. The method according to claim 11, further comprising:
directing a plurality of the transmitted m-shaped signals from the exterior surface of the exterior structure into the exterior structure and the interior structure, wherein the plurality of the transmitted m-shaped signals are generated by the gap sensing device as the gap sensing device is moved along the exterior surface of the exterior structure;
measuring a plurality of received m-shaped signals with the gap sensing device, wherein each received m-shaped signal of the plurality of received m-shaped signals corresponds with one location of a plurality of locations on the assembly and wherein each one of the plurality of received m-shaped signals comprises a corresponding m-shaped signal of the plurality of m-shaped signals influenced by the assembly;
comparing calibration data with at least one measured characteristic of the received m-shaped signal for each received m-shaped signal of the plurality of received m-shaped signals;
determining the size of the gap between the exterior structure and the interior structure at the one location for each received m-shaped signal of the plurality of received m-shaped signals based at least partially on the comparison between the calibration data and the at least one measured characteristic of the received m-shaped signal; and creating a map of the gaps in the assembly using the one location of the plurality of locations for each received m-shaped signal of the plurality of received m-shaped signals.

18. The method according to claim 17, further comprising analyzing the map of the gaps to determine at least one of:
   a predicted performance of the assembly; and
   at least one change to a manufacturing process of the assembly.

19. A system for measuring a gap between an exterior structure and an interior structure of an assembly, wherein the exterior structure is coupled to the interior structure, and the system comprises:
   a gap sensing device comprising:
      an electromagnetic dual-tuned resonant coil sensor configured to generate a transmitted m-shaped signal and to direct the transmitted m-shaped signal into the assembly from an exterior surface of the exterior structure; and
      a receiving coil configured to:
         receive a signal associated with the transmitted m-shaped signal after passing through the assembly; and
         measure at least one characteristic of a received m-shaped signal that exits the assembly and corresponds with the transmitted m-shaped signal; and
   a gap determination module configured to determine a size of the gap between the exterior structure and the interior structure based at least partially on the at least one characteristic of the received m-shaped signal.

20. The system according to claim 19, further comprising:
   a test assembly, wherein the gap sensing device is further configured to generate a second m-shaped signal, direct the second m-shaped signal into the test assembly, and measure at least one characteristic of a received second m-shaped signal that exits the test assembly and corresponds with the second m-shaped signal; and
   a calibration module configured to generate calibration data based on the at least one characteristic of the received second m-shaped signal;
   wherein the gap determination module is configured to determine the size of the gap based on a comparison between the calibration data and the at least one characteristic of the received m-shaped signal.

* * * * *